United States Patent
Okamoto

(10) Patent No.: US 7,532,344 B2
(45) Date of Patent: May 12, 2009

(54) INFORMATION PROCESSING APPARATUS

(75) Inventor: Hideaki Okamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1067 days.

(21) Appl. No.: 10/762,469

(22) Filed: Jan. 23, 2004

(65) Prior Publication Data
US 2006/0132866 A1 Jun. 22, 2006

(30) Foreign Application Priority Data
Jan. 31, 2003 (JP) .............................. 2003-024324

(51) Int. Cl.
G06F 15/00 (2006.01)
G06F 15/16 (2006.01)
(52) U.S. Cl. ..................................... 358/1.15; 709/203
(58) Field of Classification Search ................ 358/1.15, 358/1.16, 1.9, 1.13, 518, 523; 709/201, 203, 709/217, 221, 225, 229; 347/14, 86; 726/4–5; 370/352; 705/14; 715/527
See application file for complete search history.

(56) References Cited

U.S. PATENT DOCUMENTS

| 4,313,124 | A | 1/1982 | Hara |
| 4,345,262 | A | 8/1982 | Shirato et al. |
| 4,463,359 | A | 7/1984 | Ayata et al. |
| 4,723,129 | A | 2/1988 | Endo et al. |
| 4,740,796 | A | 4/1988 | Endo et al. |
| 6,189,103 | B1 * | 2/2001 | Nevarez et al. ................. 726/5 |
| 6,906,811 | B1 | 6/2005 | Teradaira et al. |
| 7,127,524 | B1 * | 10/2006 | Renda et al. ................. 709/245 |
| 2002/0057455 | A1 * | 5/2002 | Gotoh et al. ................ 358/1.15 |
| 2004/0130744 | A1 * | 7/2004 | Wu et al. .................... 358/1.15 |

FOREIGN PATENT DOCUMENTS

| JP | 09-050354 | 2/1997 |
| JP | 9-314962 | 12/1997 |
| JP | 10-297032 | 11/1998 |
| JP | 2001-199132 | 7/2001 |
| KR | 2001-0006818 | 1/2001 |

* cited by examiner

Primary Examiner—Saeid Ebrahimi Dehkordy
(74) Attorney, Agent, or Firm—Fitzpatrick, Cella, Harper & Scinto

(57) ABSTRACT

In an ink-jet print system, when a printing apparatus denies transfer of print data transferred from an information processing apparatus, if the operation state of the printing apparatus is a predetermined state, a time-out error of the information processing apparatus due to transfer denial can be prevented. When the information processing apparatus generates print data to be printed by the printing apparatus, it checks transfer permission/denial information indicating transfer permission/denial of print data, and operation information indicating an operation state of the printing apparatus, which are sent from the printing apparatus, before the generated print data is transferred to the printing apparatus. When the printing apparatus is making a recovery operation or is waiting for fixing of inks, the information processing apparatus controls to hold transfer of the print data from the information processing apparatus to the printing apparatus until such operation ends, and controls itself not to reach a time-out time due to transfer denial.

10 Claims, 6 Drawing Sheets

INFORMATION PROCESSING APPARATUS

FIELD OF THE INVENTION

The present invention relates to print control that allows a printing apparatus to smoothly print on the basis of print data transmitted from an information processing apparatus while an information processing apparatus (external apparatus) such as a host computer or the like exchanges data with the printing apparatus. Practical examples of such printing apparatus include office machines such as a printer, copying machine, facsimile apparatus, and the like, industrial production machines, and the like, which can be connected to an information processing apparatus.

BACKGROUND OF THE INVENTION

For example, as information output apparatuses for word-processors, personal computers (PC), facsimile apparatuses, and the like, printing apparatuses, which print information of desired characters, images, and the like on sheet-like print media such as paper sheets, films, and the like, have been prevalently used.

In recent years, most of printing apparatuses are connected to information processing apparatuses (or often referred to as external apparatuses) such as an IBM PC, PC-compatible computer, and the like which have a window operating system (e.g., Microsoft Windows® operating system or the like) when they are used.

In this configuration, i.e., in a print system including a printing apparatus and information processing apparatus, or the like, for example, a document (e.g., print data or the like) created by application software which runs on the information processing apparatus (e.g., a host computer) is converted into a format suited to the printing apparatus by a printer driver stored in the information processing apparatus, and the converted print data or the like is transferred from the host computer to the printing apparatus.

On the other hand, upon reception of print data transferred from the host computer, the printing apparatus temporarily stores the received print data in a print data buffer. Then, the printing apparatus reads out the stored print data, and prints images or characters on a print medium while scanning a printhead on the print medium-by a predetermined band width.

Note that the print data buffer is used to absorb the difference between the transfer speed of print data transferred by the printer driver, and the print speed printed by the printing apparatus. For example, when the print data buffer becomes empty (stores no print data), the printing apparatus stops its print operation; when the print buffer becomes full of print data, the printing apparatus sends a transfer denial message to the information processing apparatus such as a host computer or the like so as not to transfer print data.

After that, when the print operation continues and the print data buffer has an empty space, the printing apparatus cancels the transfer denial message. At this time, when the printing apparatus sends a transfer denial message to the information processing apparatus, the printer driver stored in the information processing apparatus acquires error information from the printing apparatus to recognize the operation state of the printing apparatus after an elapse of a predetermined period of time. When any error has occurred in the printing apparatus, the printer driver immediately displays it to notify the user of this.

However, in the conventional printing apparatus, when a transfer denial message of print data from the information processing apparatus continues for a long period of time due to a factor other than occurrence of an error, the printer driver detects time-out due to transfer denial, and terminates abnormally.

In order to avoid abnormal termination due to time-out, a technique for, when the print buffer of the printing apparatus becomes nearly full of data, lowering the reception speed of print data by the printing apparatus to extend the time until the buffer becomes full of data (e.g., Japanese Patent Laid-Open No. 10-297032 or the like) has been disclosed.

With this process, a transfer denial factor in the printing apparatus can be removed before the printer driver detects a time-out.

However, in the aforementioned conventional ink-jet print system, when the print buffer of the printing apparatus becomes nearly full of data, the reception speed of print data must be lowered to extend the time until the buffer becomes full of data. Hence, a technique (control member or the like) that implements such control must be equipped, resulting in an expensive printing apparatus.

In order to avoid the aforementioned time-out, a long time-out time may be set in the information processing apparatus. However, this measure induces another problem (e.g., when any abnormality has occurred in the printing apparatus, error display indicating occurrence of abnormality is delayed due to an increase in time-out time). For this reason, the printing apparatus that takes such measure against a time-out becomes not easy to use.

SUMMARY OF THE INVENTION

The present invention has been made to solve the aforementioned conventional problems, and can provide an information processing apparatus, which can prevent an error due to a time-out caused by transfer denial of print data from the information processing apparatus to a printing apparatus in an ink-jet print system in accordance with the operation state of the printing apparatus even when the printing apparatus denies transfer of print data transferred from the information processing apparatus, and can appropriately make error display even when any abnormality has occurred in the printing apparatus.

An information processing apparatus according to an embodiment of the present invention comprises the following arrangement. That is, there is provided an information processing apparatus which is connected to an ink-jet printing apparatus that prints an image by ejecting ink onto a print medium on the basis of print data, and can exchange data with the ink-jet printing apparatus, comprising: print data generation means for generating print data for an image to be printed by the ink-jet printing apparatus; transfer means for transferring the generated print data to the ink-jet printing apparatus; and control means for controlling transfer of the print data by the transfer means in accordance with transfer permission/denial information indicating transfer permission/denial of the print data, and operation information indicating an operation state of the ink-jet printing apparatus, which are sent from the ink-jet printing apparatus.

According to another aspect of the present invention, a method of controlling an information processing apparatus according to an embodiment of the present invention comprises the following arrangement. That is, there is provided a method of controlling an information processing apparatus which is connected to an ink-jet printing apparatus that prints an image by ejecting ink onto a print medium on the basis of print data, and can exchange data with the ink-jet printing apparatus, comprising: a print data generation step of generating print data for an image to be printed by the ink-jet printing apparatus; a transfer step of transferring the generated print data to the ink-jet printing apparatus; and a control step of controlling transfer of the print data in the transfer step in accordance with transfer permission/denial information indicating transfer permission/denial of the print data, and operation information indicating an operation state of the ink-jet printing apparatus, which are sent from the ink-jet printing apparatus.

According to still another aspect of the present invention, an ink-jet printing apparatus according to an embodiment of the present invention comprises the following arrangement. That is, there is provided an ink-jet printing apparatus connected to an information processing apparatus, comprising: transmission means for transmitting, to the information processing apparatus, transfer permission/denial information indicating transfer permission/denial of print data; and printing means for printing an image by ejecting ink onto a print medium on the basis of the print data received from the information processing apparatus.

According to still another aspect of the present invention, an ink-jet print system according to an embodiment of the present invention comprises the following arrangement. That is, there is provided an ink-jet print system, which comprises an ink-jet printing apparatus that prints an image by ejecting ink onto a print medium on the basis of print data, and an information processing apparatus which is connected to the ink-jet printing apparatus and can exchange data with the ink-jet printing apparatus, the information processing apparatus comprising: print data generation means for generating print data for an image to be printed by the ink-jet printing apparatus; transfer means for transferring the generated print data to the ink-jet printing apparatus; and control means for controlling transfer of the print data by the transfer means in accordance with transfer permission/denial information indicating transfer permission/denial of the print data, and operation information indicating an operation state of the ink-jet printing apparatus, which are sent from the ink-jet printing apparatus, and the ink-jet printing apparatus comprising: transmission means for transmitting, to the information processing apparatus, transfer permission/denial information indicating transfer permission/denial of the print data; and printing means for printing an image by ejecting ink onto a print medium on the basis of the print data received from the information processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
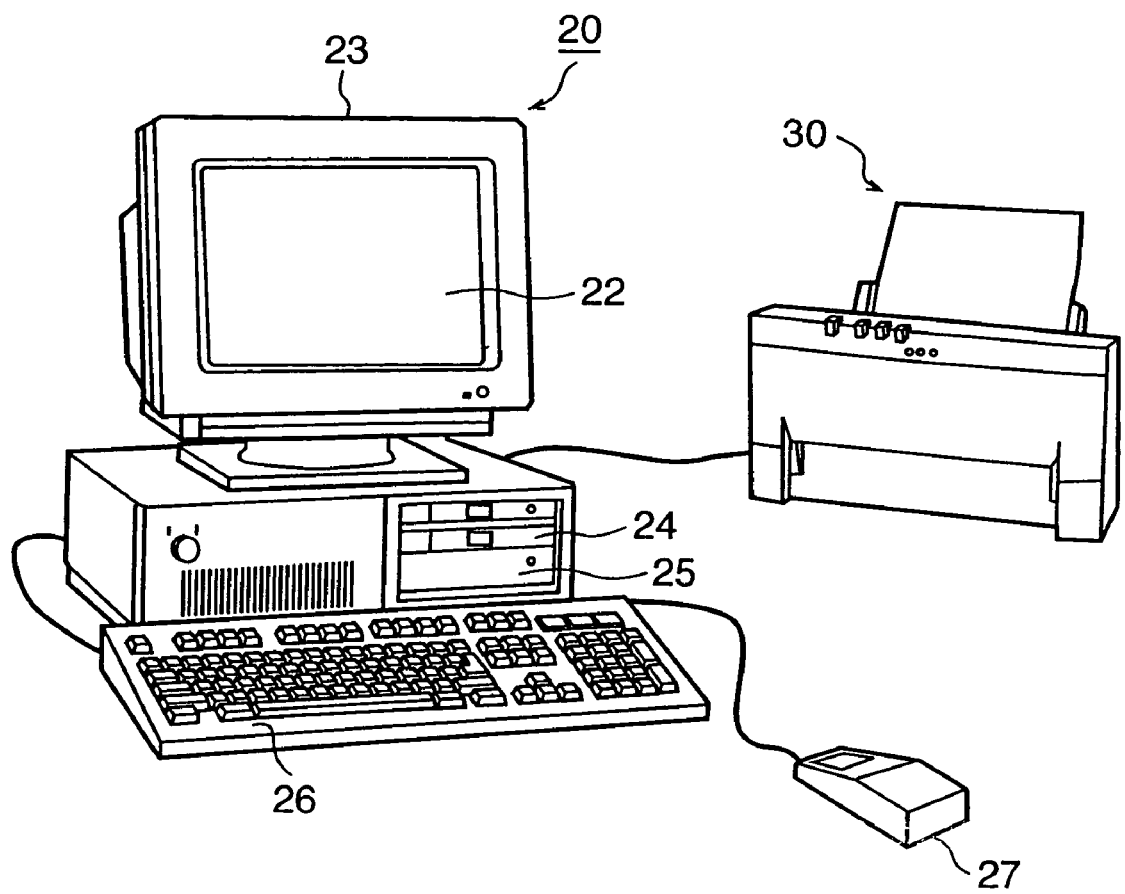
FIG. 1 is a perspective view showing an example of the outer appearance of a print system which comprises a computer and printer according to the present invention.

Preferred embodiments of the present invention will now be described in detail in accordance with the accompanying drawings.

As described above, the present invention is practiced by various aspects. More specifically, each of these aspects preferably has the following arrangements.

For example, upon detection of transfer denial of the print data based on the transfer permission/denial information, the control means preferably controls the transfer means to wait without transferring the print data, and measures a time for waiting.

For example, when the control means controls the transfer means to wait and receives next transfer permission/denial information that permits transfer of the print data while the time for waiting is not more than a predetermined period of time, the control means preferably controls the transfer means to abort waiting, and to transfer the print data to the ink-jet printing apparatus.

For example, when the control means controls the transfer means to-wait and the time for waiting exceeds a predetermined period of time, the control means preferably checks an operation state of the ink-jet printing apparatus on the basis of the operation information, and when the operation state indicates a predetermined operation state, the control means controls the transfer means to continue to wait.

For example, the predetermined operation state preferably includes one of states in which the ink-jet printing apparatus is making a recovery operation, is waiting for fixing of an ink, and is in a recoverable error state.

For example, when the control means controls the transfer means to wait and the time for waiting exceeds a predetermined period of time, the control means preferably checks an operation state of the ink-jet printing apparatus on the basis of the operation information, and when the operation state indicates an unrecoverable error state, the control means aborts waiting and informs an abnormality of the ink-jet printing apparatus.

For example, upon detection of transfer permission of the print data based on the transfer permission/denial information, the control means preferably controls the transfer means to transfer predetermined data of non-transferred print data to the ink-jet printing apparatus.

For example, when the control means controls the transfer means to wait and the time for waiting exceeds a predetermined period of time, the control means preferably checks an operation state of the ink-jet printing apparatus on the basis of the operation information, and when the operation state indicates a predetermined operation state, the control means controls to reset the time for waiting which is being measured.

For example, the predetermined operation state preferably includes one of states in which the ink-jet printing apparatus is making a recovery operation, is waiting for fixing of an ink, and is in a recoverable error state.

For example, when the control means controls the transfer means to wait and the time for waiting exceeds a predetermined period of time, the control means preferably aborts waiting, and informs an abnormality of the ink-jet printing apparatus.

Preferred embodiments of the present invention will be specifically described in more detail hereinafter with reference to the accompanying drawings.

In the embodiments to be described below, an ink-jet printer will be exemplified as a printing apparatus which adopts an ink-jet print system.

In this specification, "printing" (which may also be referred to as "print") means not only processes for forming significant information such as characters, figures, and the like, but also a variety of processes for forming images, designs, patterns, and the like on print media or processing such media irrespective of whether they are significant or insignificant, and whether they are processed to be visually perceivable by human beings.

Also, "print media" mean not only paper sheets used in normal printing apparatuses, but also media that can receive ink, such as cloth, plastic films, metal plates, glass, ceramics, wood, animal skin, and the like.

Furthermore, "ink" (which may also be referred to as "liquid") should be broadly interpreted as in definition of "printing (print)", and means a liquid which can undergo formation of images, designs, patterns, and the like, processing of print media, or ink processes (that solidify or make insoluble a color agent in ink to be applied to a print medium) when it is applied onto print media.

First Embodiment

FIG. 1 is a perspective view showing an example of the outer appearance of an ink-jet print system which comprises a typical personal computer (PC) installed with a printer driver according to this embodiment, and an ink-jet printer.

Information Processing Apparatus (Computer): FIG. 1

FIG. 1 shows a computer 20 as an example of an information processing apparatus such as an IBM PC, PC-compatible computer, or the like, which has a window operating system such as Microsoft Windows® operating system or the like.

The computer 20 comprises a display monitor 23 having a display screen 22, on which an image is displayed for the user. The computer 20 also comprises a floppy disk drive 24 (storage medium drive) which can read/write information from/on a floppy disk as an example of a removable storage medium, a fixed disk drive 25 which stores data files and application program files, a keyboard 26 which allows the user to input text data and to process objects displayed on the display screen 22, and appointing device 27 such as a mouse or the like which also allows the user to process objects displayed on the display screen 22.

Note that the arrangement shown in FIG. 1 is an example, and the computer 20 may give other connections such as connections or interfaces with a local area network or a facsimile/modem/telephone interface for receiving color image data and other files such as a file that includes a program command sequence used to manipulate the computer 20 and the like.

Ink-jet Printing Apparatus (Printer): FIG. 1

FIG. 1 shows a printer 30 as an example of a printing apparatus such as a color ink-jet printer or the like, which has a printhead. The printer 30 has an interface with the computer 20. The interface between the computer 20 and printer 30 can adopt various interfaces such as an infrared ray interface, standard Centronics printer interface, and the like. In the following description, an IEEE1284 two-way interface will be exemplified as such interface. This interface allows both the computer 20 and printer 30 to exchange data.

Furthermore, the printer 30 (printing apparatus) transmits, to the computer 20 (information processing apparatus), a transfer permission/denial signal (BUSY signal) that notifies transfer permission or transfer denial of print data to be transferred from the computer 20 to the printer 30.

That is, upon reception of print data transferred from the computer 20, the printer 30 temporarily stores the received print data in a print data buffer. Then, the printer 30 reads out the stored print data, and prints images or characters on a print medium while scanning a printhead on the print medium by a predetermined band width. In this case, if the print data buffer is full of data, i.e., has no space to store print data any more, the printer 30 (printing apparatus) transmits a transfer denial signal (Busy) to the computer 20 as transfer permission/denial information; if the print data buffer has a space to store print data, the printer 30 transmits a transfer permission signal as transfer permission/denial information.

The computer 20 checks this transfer permission/denial signal (transfer denial signal or transfer permission signal) transmitted from the printer 30 at given time intervals, and determines "transfer permission" or "transfer denial" of print data to be transferred to the printer 30 on the basis of the received transfer permission/denial signal.

The printer 30 includes an ink-jet printhead, which has a plurality of ink ejection nozzles vertically aligned in groups of a plurality of colors. The printer 30 also has ejection recovery means (not shown) that makes ejection recovery operations for respective nozzle arrays so as to obtain a good print result. As a function unique to an ink-jet printing apparatus, the printer 30 has a function of waiting for fixing (dry) of inks for the previous page so as to prevent the inks from becoming attached to the next page when an output with a high print density is made.

Note that the printer 30 can inform the computer of its operation state. For example, when the printer 30 is making a recovery process of the printhead using the ejection recovery means, it can inform the computer 20 of a state in which an ejection recovery process is underway. For example, when an output with a high print density is made, the printer 30 can inform the computer 20 of a state in which it waits for fixing (drying) of inks for the previous page so as to prevent the inks from becoming attached to the next page.

Furthermore, when an error that allows user's recovery operations (e.g., when print media or inks are used up) has occurred, the printer 30 can inform the computer of occurrence of a recoverable error state. On the other hand, when a failure has occurred, and the user cannot recover, the printer 30 can inform the computer of occurrence of an unrecoverable error state.

Note that the above operation states are examples, and other operation states can be used as examples of recoverable and unrecoverable error states.

In this manner, when the computer 20 sends a print data transfer command to the printer 30, the printer 30 can transmit a signal indicating various operation states such as a recovery operation underway, fixing waiting underway, a recoverable error, an unrecoverable error, and the like described above as response data indicating the operation state of the printer 30, in addition to the aforementioned transfer permission/denial signal.

Hence, the computer 20 can control to start or hold transfer of print data to be transferred on the basis of the transfer permission/denial signal received from the printer 30. Also, the computer 20 can recognize the operation state of the printer 30 on the basis of the response data received from the printer 30. When the operation state of the printer 30 indicates one of the recovery operation underway, fixing waiting underway, and a recoverable error, the computer 20 can control to hold print data to be transferred until the recovery operation, fixing waiting operation, or error recovery operation is complete. Also, when the operation state of the printer 30 indicates an unrecoverable error, the computer 20 can abort transfer of print data, and can immediately notify occurrence of an unrecoverable error.

Figure 2:
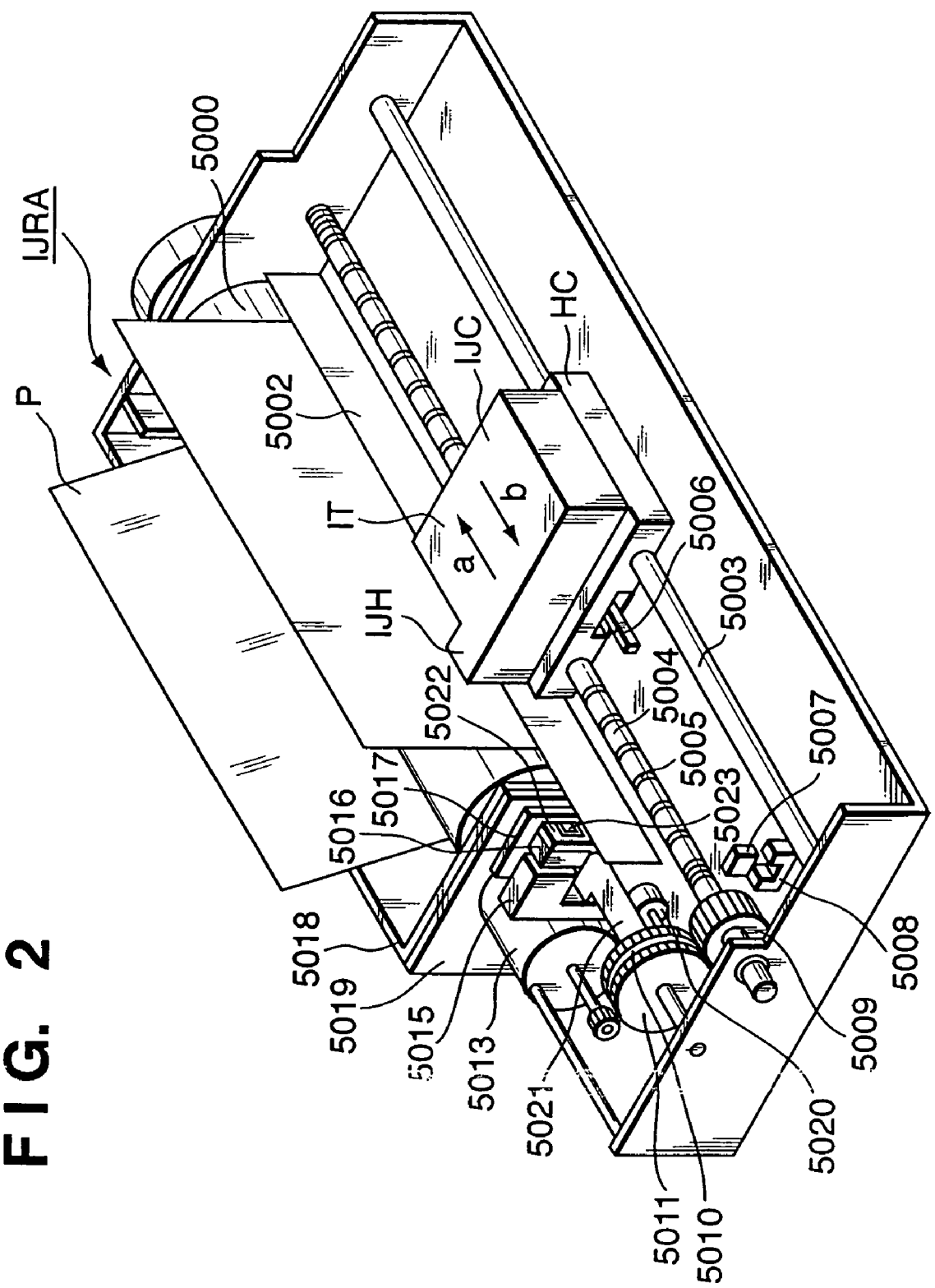
FIG. 2 is a perspective view showing an example of the outer appearance of another printer according to the present invention.

Ink-jet Printing Apparatus: FIG. 2

Note that this embodiment is not limited to the printer 30 in FIG. 1, and various other ink-jet printing apparatuses may be used. FIG. 2 is a perspective view showing the outer appearance of an IJRA as another example of the ink-jet printing apparatus.

Referring to FIG. 2, a carriage HC engages with a spiral groove 5004 of a lead screw 5005, which rotates via driving force transmission gears 5009 to 5011 in cooperation with the forward/reverse rotation of a driving motor 5013, and has a pin (not shown). The carriage HC reciprocally moves in the directions of arrows a and b while being supported by a guide rail 5003. An integrated type ink-jet cartridge IJC that incorporates a printhead IJH and an ink tank IT is carried on the carriage HC.

Reference numeral 5002 denotes a paper pressing plate which presses a printing paper sheet P against a platen 5000 along the moving direction of the carriage HC. Reference numerals 5007 and 5008 denote photocouplers which serve as a home position detector for confirming the presence of a lever 5006 of the carriage HC in the corresponding region, and performing, e.g., the switching operation of the rotation direction of the motor 5013.

Reference numeral 5016 denotes a member for supporting a cap member 5022 that caps the front surface of the printhead IJH; and 5015, a suction device that sucks in this cap to attain suction recovery of the printhead via an intra-cap opening 5023. Reference numeral 5017 denotes a cleaning blade; and 5019, a member which allows the blade 5017 to be movable in the back-and-forth direction. These members are supported by a main body support plate 5018. The blade is not limited to this specific one, but a known cleaning blade can be applied to this embodiment, needless to say.

Reference numeral 5021 denotes a lever for initiating suction of suction recovery. The lever 5021 moves upon movement of a cam 5020 which engages with the carriage HC, and its movement is controlled by a known transmission mechanism such as clutch switching by the driving force from a driving motor.

These capping, cleaning, and suction recovery are performed at their corresponding positions upon operation of the lead screw 5005 when the carriage HC arrives the region on the home position side. However, the present invention is not limited to a specific arrangement, as long as desired operations are performed at known timings.

Note that the IJRA can transmit a transfer permission/denial signal (BUSY signal) that notifies either a transfer permission signal indicating transfer permission information of print data to be transferred from the computer 20 to the printer 30 or a transfer denial signal indicating transfer denial, and can transmit response data indicating the operation state (recovery process state, fixing waiting state, unrecoverable error state, recoverable error state, and the like) of the IJRA to the computer-20, as in the printer 30 described using FIG. 1. However, since details of them have already been described, a repetitive description thereof will be avoided.

In the aforementioned print system, stored application programs such as a graphics application program, drawing application program, desktop publishing application program, and the like selectively run to process and manipulate data in accordance with operator's commands and under the control of the window operating system. An image is displayed on the monitor 23 and a command that requests to print the image displayed on the monitor 23 by the printer 30 is issued in accordance with operator's commands and on the basis of these stored application programs.

Figure 3:
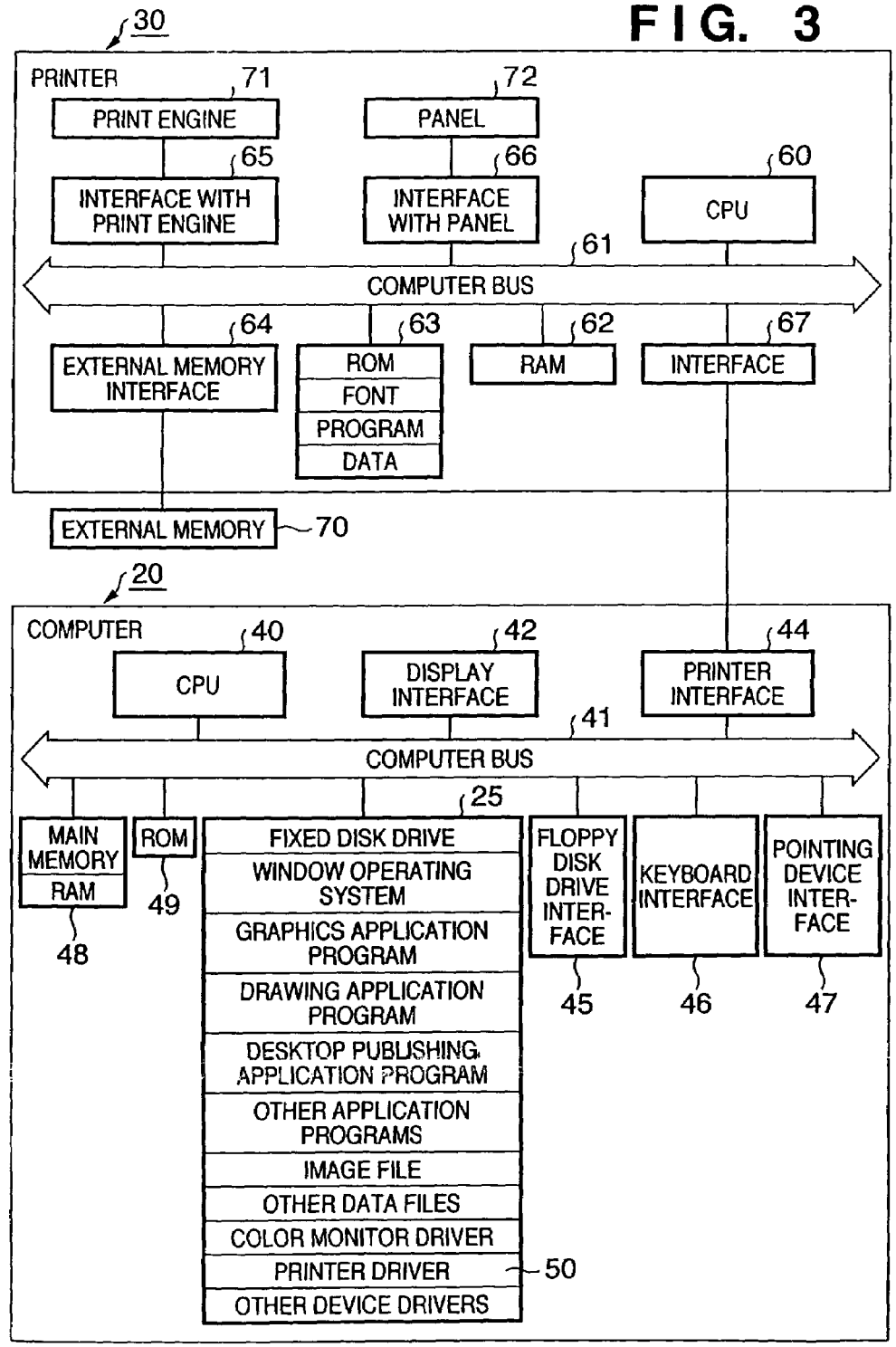
FIG. 3 is a block diagram showing the internal arrangement of the computer and printer.

Internal Arrangement of Computer and Printer: FIG. 3

FIG. 3 is a block diagram showing an example of the internal arrangement of the computer 20 and printer 30.

As shown in FIG. 3, the computer 20 includes a central processing unit (CPU) 40 such as a programmable microprocessor or the like, which interfaces with a computer bus 41. To the computer bus 41, a display interface 42 that interfaces with the display 23, a printer interface 44 that interfaces with the printer 30, a floppy disk drive interface 45 that interfaces with the floppy disk drive 24, a keyboard interface 46 that interfaces with the keyboard 26, and a pointing device interface 47 that interfaces with the pointing device 27 are also connected.

A main memory 48 which comprises a random-access memory (RAM) or the like is connected to the computer bus 41 so as to allow the CPU 40 to access its memory area. Especially, upon executing a stored application program command sequence such as command sequences associated with application programs stored on the fixed disk drive 25, the CPU 40 loads such application command sequence from the fixed disk drive 25 (or other storage media such as media that can be accessed via a network or the floppy disk drive 24) onto the main memory 46, and executes it on the main memory 48.

As will be described in detail later, the main memory 48 comprises a print data buffer which is used by a printer driver according to this embodiment. Also, the main memory 48 can swap memory segments including the print data buffer with the fixed disk drive 25 using a standard disk swapping technique which can be used under the window operating system.

A read-only memory (ROM) 49 stores permanent command sequences such as a startup command sequence, a basic input/output operating system (BIOS) required to operate the keyboard 26, and the like.

As shown in FIG. 3, and as described above, the fixed disk drive 25 stores the program command sequence of the window operating system, and program command sequences of various application programs such as a graphics application program, drawing application program, desktop publishing application program, and the like.

The fixed disk drive 25 also stores color image files which are displayed on the monitor 23 or printed by the printer 30 under the control of the designated application program. Furthermore, the fixed disk drive 25 stores a color monitor driver which controls the method of inputting multi-valued RGB primary color values to the display interface 42, and a printer driver 50 as a driver that controls the method of deriving CMYK color component values from the RGB primary color values, and inputting them to the printer interface 44 to be able to be printed by the printer 30.

The fixed disk drive 25 stores various other device drivers which supply appropriate signals to various devices such as a network device, facsimile device, and the like connected to the computer 20. Normally, the application programs and drivers stored in the fixed disk drive 25 are installed by the user from other computer readable media that initially store these programs and drivers onto the fixed disk drive 25.

For example, the user normally purchases a floppy disk or another computer readable medium such as a CD-ROM or the like that stores a copy of the printer driver of the present invention. The user installs the printer driver 50 on the fixed disk drive 25 via a known technique for copying a printer driver onto the fixed disk drive 25. At the same time, the user can download the printer driver according to the present invention from a file server or a digital bulletin board system via a modem interface or network (neither are shown).

As shown in FIG. 3, the printer 30 includes a CPU 60 such as a V853 single-chip microprocessor or the like, which is connected to a computer bus 61. To the computer bus 61, a RAM 62, ROM 63, external memory interface 64, interface 65 with a print engine, interface 66 with a panel, and interface 67 with the computer 20 are also connected.

The RAM 62 comprises a storage area used for the printer 30, and includes a print data buffer area. The ROM 63 comprises a font ROM that stores font data, a program ROM that stores a program command sequence used to control the printer 30, and permanent data such as the model number of the printer and the like. The external memory interface 64 interfaces with an external memory cartridge such as a cartridge 70 which provides additional font data for the printer 30, or provides an additional random-access memory, or the like.

The interface 65 includes other interfaces such as an interface with the printhead (not-shown), an interface with drive means for the carriage, an interface with the capping mechanism and pump (neither are shown), an interface with a document feeder, an interface with printer nozzle control, and the like, and interfaces with a print engine 71.

The interface 66 with a panel 72 includes an LCD display that displays printer status, an LED display that indicates an on- or off-line state or an error state, and various control buttons which are used to make setups in the printer 30 and to interface with the printer 30 by other methods. The interface 67 includes a two-way interface with the printer interface 44 of the computer 20.

FIG. 3 illustrates individual building components of the printer 30 as independent, different ones. However, it is preferable to combine at least some of these building components. For example, the external memory interface 64, interface 65 with the print engine, interface 66 with the panel, and interface 67 are preferably combined as a single gate array. Most preferably, the aforementioned gate array is combined with the CPU 60, RAM 62, and ROM 63 as a so-called four-in-one chip, thus obviating the need for independent lead lines to the computer bus. As a result, the number of interconnections required to manufacture a controller of the printer 30 can be reduced.

Figure 4:
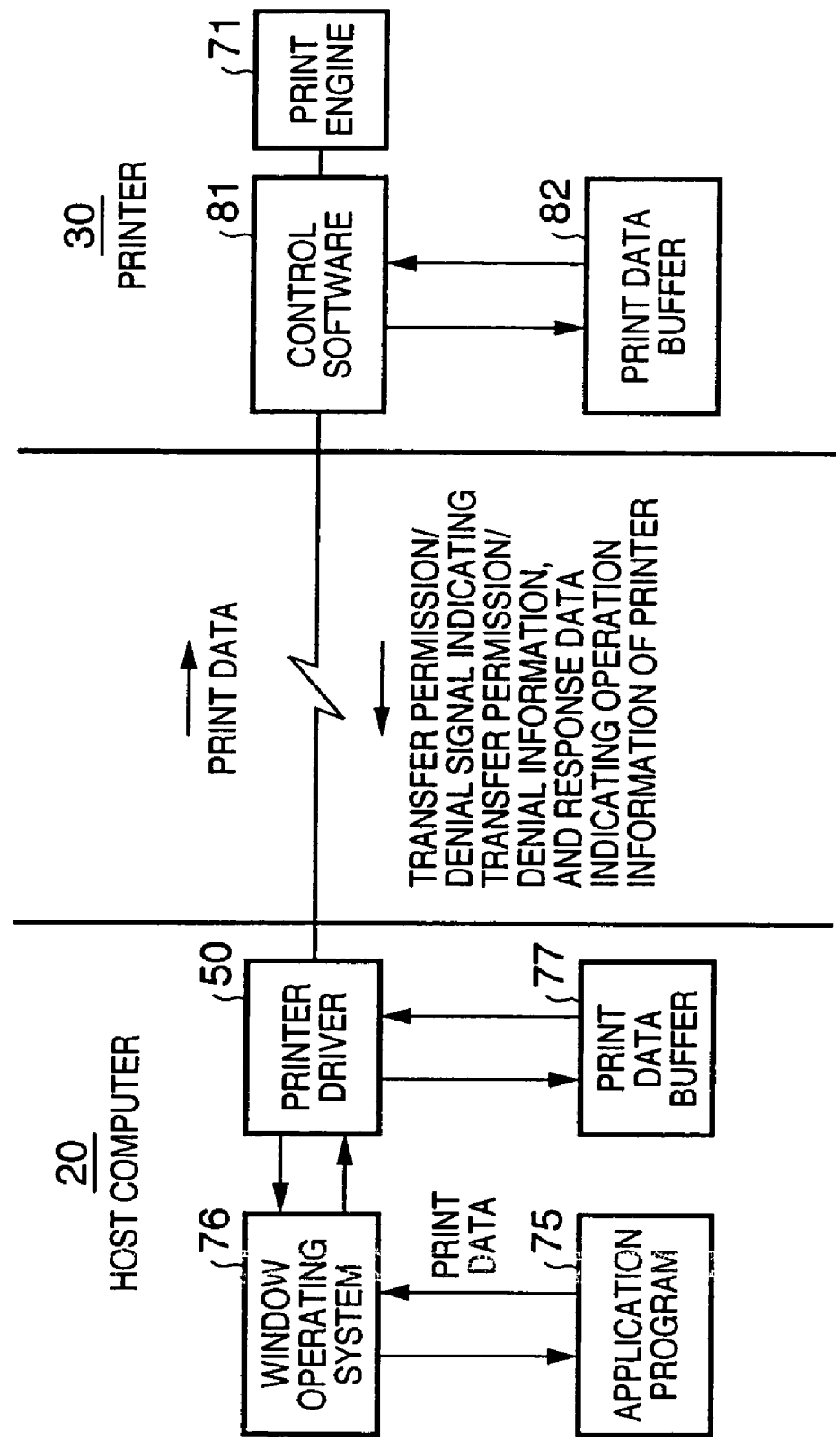
FIG. 4 is a functional block showing an example of respective functions and interconnection of the computer and printer.

Functional Blocks of Computer and Printer: FIG. 4

FIG. 4 is a functional block diagram showing an example of respective functions and interconnections of the computer and printer so as to exemplify how the computer 20 interacts with the computer 30 upon practicing the present invention.

As shown in FIG. 4, a window operating system 76 issues an interface call of a graphics device to the printer driver 50 in response to a print command issued by an application program 75 such as an image processing application or the like stored in the fixed disk drive 25. According to this embodiment, the printer driver 50 acquires print data corresponding to the print command from the application 75, and stores it in a print data buffer 77.

As described above, the print data buffer 77 can be assured in the RAM 48 or fixed disk drive 25, or can be initially stored in the RAM 48 and be swapped with the fixed disk drive 25 via the disk swapping operation of the operating system 76. After that, in this case as well, according to this embodiment, the printer driver 50 acquires print data from the print data buffer 77, transfers the print data (printing data) to the printer 30 via the interfaces 44 and 67, and controls the printer 30 to print an image based on this print data.

The printer 30 on the receiving side receives the print data from the printer driver 50 using control software 81 as a program stored in the ROM 63, and stores it in a print data buffer 82. The print data buffer 82 is assured in the RAM 62. After that, the control software 81 searches the print data buffer 82 for stored print data, processes the found print data by, e.g., a decompression process and the like (to be described later), sends that print data to the print engine 71, and controls the print engine to print an image.

In the aforementioned ink-jet print system, upon transferring print data from the information processing apparatus (computer 20 or the like) to the ink-jet printing apparatus (printer 30 or the like) to print an image, even when the duration of a state in which the ink-jet printing apparatus denies transfer of print data transferred from the information processing apparatus has exceeded a predetermined period of time (in case of time-out), the information processing apparatus executes a process corresponding to specific response data (e.g., transfer permission/denial information (transfer permission information or transfer denial information) indicating permission/denial of transfer of print data, and operation information indicating the operation state of the ink-jet printing apparatus) without terminating abnormally as long as it receives such response data. Such application example will be explained below.

Figure 5:
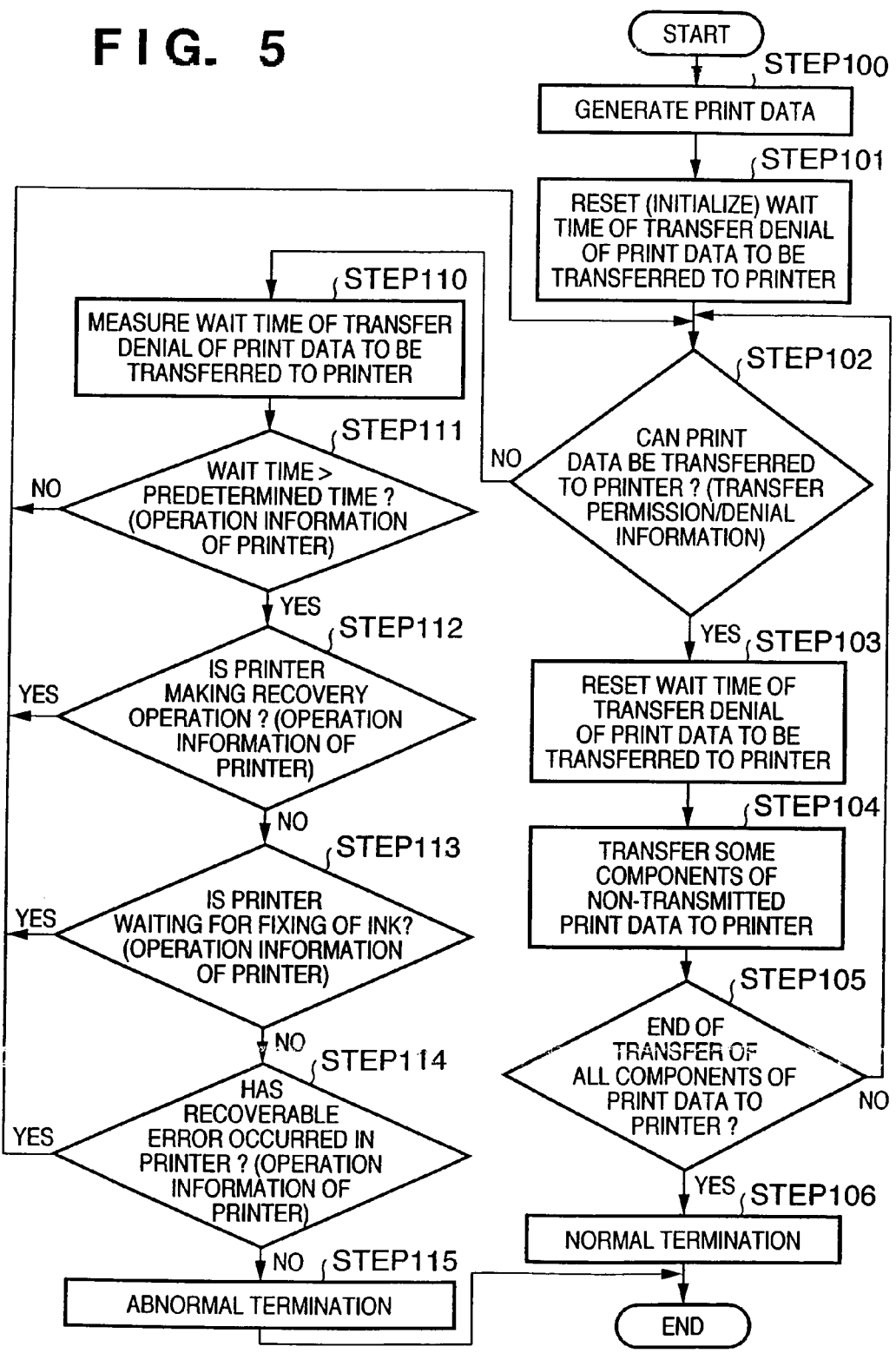
FIG. 5 is a flow chart for explaining a print process according to the first embodiment of the present invention.

Sequence of Print Process: FIG. 5

FIG. 5 is a flow chart showing the sequence of a print process executed by the computer 20 in the ink-jet print system according to this embodiment. The CPU 40 executes the process shown in FIG. 5 on the basis of the printer driver 50 stored in the fixed disk drive 25 while controlling the respective units of the computer 20.

Referring to FIG. 5, if the user makes a print operation on the basis of the application program which runs on the computer 20, the printer driver 50 acquires print information corresponding to that print command from the application program, and generates print data which can be printed by the printer 30 in step S100.

In step S101, upon transferring print data from computer 20 to the printer 30, a wait time for counting a lapse of time that the transference of the print data is denied by the printer 30 is initialized (reset).

It is determined in step S102 whether or not print data can be transferred to the printer 30. For this purpose, the contents (a transfer denial signal indicating transfer denial information or a transfer permission signal indicating transfer permission information) of a transfer permission/denial signal (Busy signal) received from the printer 30 are checked. If it is determined in step S102 that print data can be transferred, the flow advances to step S103; otherwise, the flow advances to step S110.

In step S103, the wait time of transfer denial is reset by the same process as that executed in step S101, and the flow advances to step S104. In step S104, some data components of non-transmitted print data, which is not transferred to the printer 30, are transferred to the printer 30.

It is checked in step S105 if all components of print data to be transferred to the printer 30 have been transferred. If YES in step S105, the flow advances to step S106 to execute a normal termination process; otherwise, the flow returns to step S102 to repeat the aforementioned processes in steps S102 to S105.

On the other hand, in step S110 since print data cannot be transferred to the printer 30, a wait time of transfer denial is measured. If the measurement has already been started, that measurement is continued; otherwise, a measurement is started.

In step S111, the measured wait time is compared with a predetermined period of time, which is set in advance. If the measured wait time is equal to or shorter than the predetermined period of time, the flow returns to step S102 to continue the aforementioned process. On the other hand, if the measured wait time is longer than the predetermined period of time, the flow advances to step S112.

It is checked in step S112 if response data (operation information indicating the operation state of the printer 30) received from the printer 30 is data indicating that a recovery operation is underway. If the recovery operation of the printer 30 is underway, the flow returns to step S102 to execute the aforementioned process. If the received response data is not data indicating that a recovery operation is underway, the flow advances to step S113.

It is checked in step S113 if the response data received from the printer 30 is data indicating fixing waiting of inks. If the printer 30 is waiting for fixing of inks, the flow returns to step S102 to execute the aforementioned process. On the other hand, if the received response data is not data indicating fixing waiting of inks, the flow advances to step S114.

It is checked in step S114 if the response data received from the printer 30 is data indicating a (recoverable) error that allows the printer 30 to normally recovery its operation. If the received response data is data indicating a recoverable error, the flow returns to step S102 to execute the aforementioned process. On the other hand, if the received response data is data indicating an unrecoverable error of the printer 30, the flow advances to step S115. In step S115, abnormal termination indicating that an unrecoverable error has occurred in the printer 30 is informed, and a process for aborting the transfer process is executed, thus ending a series of processes.

Second Embodiment

The second embodiment will be described below. In the following description, the figures common to those in the first embodiment and their description will be omitted, and only differences will be explained.

In the first embodiment, when the computer 20 receives transfer denial information from the printer 30, it measures a wait time. When the computer 20 does not receive any transfer permission information after the measured time has exceeded the predetermined period of time, it checks the operation state of the printer, and determines whether the wait state is to continue or a printer error is informed, in accordance with the operation state.

On the other hand, in the second embodiment, upon reception of transfer denial information from the printer 30, the computer 20 immediately checks the operation state of the printer. Only when the operation state indicates a recoverable error, the computer 20 resets the wait time, thus preventing the printer 30 from reaching a time-out time.

The sequence of the print process in the ink-jet print system of the second embodiment will be explained below using the flow chart of FIG. 6.

Sequence of Print Process: FIG. 6

Figure 6:
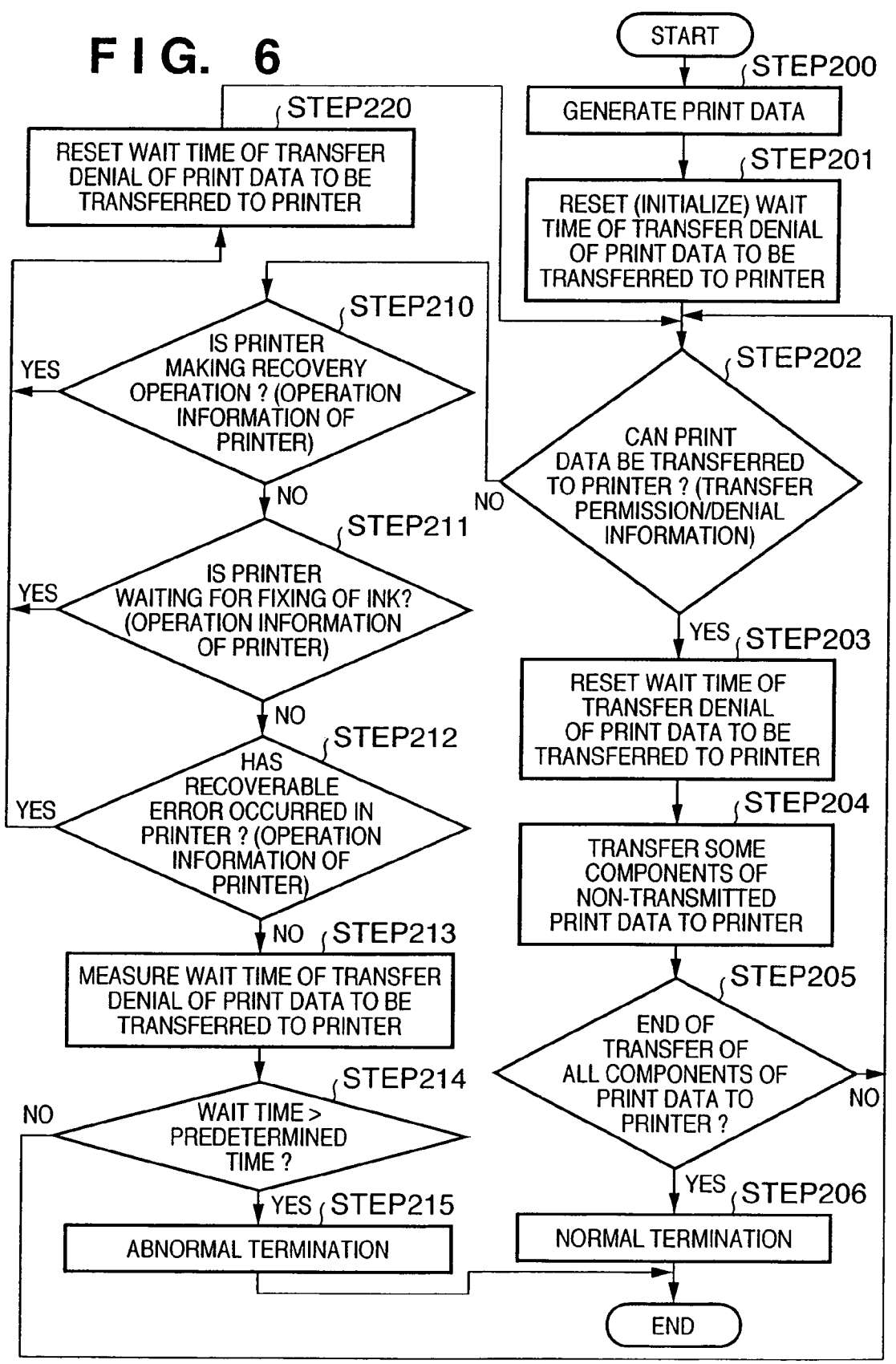
FIG. 6 is a flow chart for explaining a print process according to the second embodiment of the present invention.

FIG. 6 is a flow chart showing the sequence of a print process executed by the computer 20 in the ink-jet print system according to this embodiment. The CPU 40 executes the process shown in FIG. 6 on the basis of the printer driver 50 stored in the fixed disk drive 25 while controlling the respective units of the computer 20.

Referring to FIG. 6, if the user makes a print operation on the basis of the application program which runs on the computer 20, the printer driver 50 acquires print information corresponding to that print command from the application program, and generates print data which can be printed by the printer 30 in step S200.

In step S201, upon transferring print data from computer 20 to the printer 30, a wait time for counting a lapse of time that the transference of the print data is denied by the printer 30 is initialized (reset).

It is determined in step S202 whether or not print data can be transferred to the printer 30. For this purpose, the contents (a transfer denial signal indicating transfer denial information or a transfer permission signal indicating transfer permission information) of a transfer permission/denial signal (Busy signal) received from the printer 30 are checked. If it is determined in step S202 that print data can be transferred, the flow advances to step S203; otherwise, the flow advances to step S210.

In step S203, the wait time of transfer denial is reset by the same-process as that executed in step S201, and the flow advances to step S204. In step S204, some data components of non-transmitted print data, which is not transferred to the-printer 30, are transferred to the printer 30.

It is checked in step S205 if all components of print data to be transferred to the printer 30 have been transferred. If YES in step S205, the flow advances to step S206 to execute a normal termination process; otherwise, the flow returns to step S202 to repeat the aforementioned processes in steps S202 to S205. The sequence described so far is the same as process 1 in the first embodiment.

On the other hand, if it is determined in step S202 that print data cannot be transferred to the printer 30, the flow advances to step S210 to check if response data from the printer 30 is data indicating that a recovery operation is underway.

It is checked in step S210 if response data (operation information indicating the operation state of the printer 30) received from the printer 30 is data indicating that a recovery operation is underway. If the recovery operation of the printer 30 is underway, the flow advances to step S220 to reset the wait time of transfer denial by the same process as that executed in step S201. The flow then returns to step S202 to continue the aforementioned process. If the received response data is not data indicating that a recovery operation is underway, the flow advances to step S211.

It is checked in step S211 if the response data received from the printer 30 is data indicating fixing waiting of inks. If the printer 30 is waiting for fixing of inks, the flow advances to step S220 to reset the wait time. The flow then returns to step S202 to execute the aforementioned process. On the other hand, if the received response data is not data indicating fixing waiting of inks, the flow advances to step S212.

It is checked in step S212 if the response data received from the printer 30 is data indicating a (recoverable) error that allows the printer 30 to normally recovery its operation. If the received response data is data indicating a recoverable error, the flow advances to step S220 to reset the wait time. The flow then returns to step S202 to execute the aforementioned process. On the other hand, if the received response data is data indicating an unrecoverable error of the printer 30, the flow advances to step S213 to measure a wait time of transfer denial. If the measurement has already been started, that measurement is continued; otherwise, a measurement is started.

In step S214, the measured wait time is compared with a predetermined period of time, which is set in advance. If the measured wait time is equal to or shorter than the predetermined period of time, the flow returns to step S202 to continue the aforementioned process. On the other hand, if the measured wait time is longer than the predetermined period of time, the flow advances to step S215.

In step S215, abnormal termination indicating that an unrecoverable error has occurred in the printer 30 is informed, and a process for aborting the transfer process is executed, thus ending a series of processes end.

As the typical arrangement and principle of the ink-jet printing system, one practiced by. use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a single printing head obtained by forming printing heads integrally can be used.

In addition, not only an exchangeable chip type printing head, as described in the above embodiment, which can be electrically connected to the apparatus main unit and can receive an ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include, for the printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printing head or by combining a plurality of printing heads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program code for performing the aforesaid processes to a computer system or apparatus (e.g., a personal computer), reading the program code, by a CPU or MPU of the computer system or apparatus, from the storage medium, then executing the program. In this case, the program code read from the storage medium realize the functions according to the embodiments, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, additional functions according to the above embodiments are realized by executing the program code which are read by a computer. The present invention includes a case where an OS (operating system) or the like working on the computer performs a part or entire process in accordance with designations of the program code and realizes functions according to the above embodiments.

Furthermore, the present invention also includes a case where, after the program code read from the storage medium are written in a function expansion card which is inserted into the computer or in a memory provided in a function expansion unit which is connected to the computer,sa CPU or the like contained in the function expansion card or function expansion unit performs a part or entire process in accordance with designations of the program code and realizes functions of the above embodiments.

When the present invention is applied to the above storage medium, that storage medium stores programs which implements the aforementioned processes shown in FIGS. 5 and 6, and the like.

As described above, according to the present invention, a convenient, inexpensive printing apparatus can be provided since the printing apparatus transfers appropriate response data in a printing system which comprises an information processing apparatus and printing apparatus, and executes a print process while exchanging data between the information processing apparatus and printing apparatus.

As described above, in an information processing apparatus of the present invention, even when a printing apparatus in an ink-jet print system denies transfer of print data transferred from the information processing apparatus, the wait time of print data to be transferred from the information processing apparatus is changed in accordance with the operation state of the printing apparatus, thus preventing any error due to a time-out of transfer denial of print data from the information processing apparatus to the printing apparatus, and displaying an appropriate error message upon occurrence of an abnormality in the printing apparatus.

As many apparently widely different embodiments of the present invention can be made without departing from the spirit and scope thereof, it is to be understood that the invention is not limited to the specific embodiments thereof expect as defined in the claims.

What is claimed is:

1. An information processing apparatus which is connected to an ink-jet printing apparatus that prints an image by ejecting ink onto a print medium on the basis of print data, and can exchange data with the ink-jet printing apparatus, comprising:

print data generation means for generating print data for an image to be printed by the ink-jet printing apparatus;

transfer means for transferring the generated print data to the ink-jet printing apparatus; and control means for controlling transfer of the print data by said transfer means in accordance with transfer permission/denial information indicating transfer permission/denial of the print data, and operation information indicating an operation state of the ink-jet printing apparatus, which are sent from the ink-jet printing apparatus, wherein upon detection of transfer denial of the print data based on the transfer permission/denial information, said control means controls said transfer means to wait without transferring the print data, and measures a time for waiting, and wherein when said control means controls said transfer means to wait and receives next transfer permission/denial information that permits transfer of the print data while the time for waiting is not more than a predetermined period of time, said control means controls said transfer means to abort waiting, and to transfer the print data to the ink-jet printing apparatus.

2. An information processing apparatus which is connected to an ink-jet printing apparatus that prints an image by ejecting ink onto a print medium on the basis of print data, and can exchange data with the ink-jet printing apparatus, comprising:

print data generation means for generating print data for an image to be printed by the ink-jet printing apparatus;

transfer means for transferring the generated print data to the ink-jet printing apparatus; and control means for controlling transfer of the print data by said transfer means in accordance with transfer permission/denial information indicating transfer permission/denial of the print data, and operation information indicating an operation state of the ink-jet printing apparatus, which are sent from the ink-jet printing apparatus, wherein upon detection of transfer denial of the print data based on the transfer permission/denial information, said control means controls said transfer means to wait without transferring the print data, and measures a time for waiting, and wherein when said control means controls said transfer means to wait and the time for waiting exceeds a predetermined period of time, said control means checks an operation state of the ink-jet printing apparatus on the basis of the operation information, and when the operation state indicates a predetermined operation state, said control means controls said transfer means to continue to wait.

3. The apparatus according to claim 2, wherein the predetermined operation state includes one of states in which the ink-jet printing apparatus is effecting a recovery operation, is waiting for fixing of ink, and is in a recoverable error state.

4. An information processing apparatus which is connected to an ink-jet printing apparatus that prints an image by ejecting ink onto a print medium on the basis of print data, and can exchange data with the ink-jet printing apparatus, comprising:

print data generation means for generating print data for an image to be printed by the ink-jet printing apparatus;

transfer means for transferring the generated print data to the ink-jet printing apparatus; and control means for controlling transfer of the print data by said transfer means in accordance with transfer permission/denial information indicating transfer permission/denial of the print data, and operation information indicating an operation state of the ink-jet printing apparatus, which are sent from the ink-jet printing apparatus, wherein upon detection of transfer denial of the print data based on the transfer permission/denial information, said control means controls said transfer means to wait without transferring the print data, and measures a time for waiting, and wherein when said control means controls said transfer means to wait and the time for waiting exceeds a predetermined period of time, said control means checks an operation state of the ink-jet printing apparatus on the basis of the operation information, and when the operation state indicates an unrecoverable error state, said control means aborts waiting and informs of an abnormality of the ink-jet printing apparatus.

5. The apparatus according to claim 4, wherein the predetermined operation state includes one of states in which the ink-jet printing apparatus is effecting a recovery operation, is waiting for fixing of ink, and is in a recoverable error state.

6. An information processing apparatus which is connected to an ink-jet printing apparatus that prints an image by ejecting ink onto a print medium on the basis of print data, and can exchange data with the ink-jet printing apparatus comprising:

print data generation means for generating print data for an image to be printed by the ink-jet printing apparatus;

transfer means for transferring the generated print data to the ink-jet printing apparatus; and control means for controlling transfer of the print data by said transfer means in accordance with transfer permission/denial information indicating transfer permission/denial of the print data, and operation information indicating an operation state of the ink-jet printing apparatus, which are sent from the ink-jet printing apparatus, wherein upon detection of transfer denial of the print data based on the transfer permission/denial information, said control means controls said transfer means to wait without transferring the print data, and measures a time for waiting, and wherein when said control means controls said transfer means to wait and the time for waiting exceeds a predetermined period of time, said control means aborts waiting, and informs of an abnormality of the ink-jet printing apparatus.

7. An information processing method in an information processing apparatus which is connected to an ink-jet printing apparatus that prints an image by ejecting ink onto a print medium on the basis of print data, and can exchange data with the ink-jet printing apparatus, comprising:

a print data generation step for generating print data for an image to be printed by the ink-jet printing apparatus;

a transfer step for transferring the generated print data to the ink-jet printing apparatus; and a control step for controlling transfer of the print data by said transfer step in accordance with transfer permission/denial information indicating transfer permission/denial of the print data, and operation information indicating an operation state of the ink-jet printing apparatus, which are sent from the ink-jet printing apparatus, wherein upon detection of transfer denial of the print data based on the transfer permission/denial information, said control step controls said transfer step to wait without transferring the print data, and measures a time for waiting, and wherein when said control step controls said transfer step to wait and the time for waiting exceeds a predetermined period of time, said controls step checks an operation state of the ink-jet printing apparatus on the basis of the oepration information, and when the operation state indicates a predetermined oepration state, said control step controls said transfer step to continue to wait.

8. An information processing method in an information processing apparatus which is connected to an ink-jet printing apparatus that prints an image by ejecting ink onto a print medium on the basis of print data, and can exchange data with the ink-jet printing apparatus, comprising:

a print data generation step for generating print data for an image to be printed by the ink-jet printing apparatus;

a transfer step for transferring the generated print data to the ink-jet printing apparatus; and a control step for controlling transfer of the print data by said transfer step in accordance with transfer permission/denial information indicating transfer permission/denial of the print data, and operation information indicating an operation state of the ink-jet printing apparatus, which are sent from the ink-jet printing apparatus, wherein upon detection of transfer denial of the print data based on the transfer permission/denial information, said control step controls said transfer step to wait without transferring the print data, and measures a time for waiting, and wherein when said control step controls said transfer step to wait and the time for waiting exceeds a predetermined period of time, said control step checks an operation state of the ink-jet printing apparatus on the basis of the operation information, and when the operation state indicates an unrecoverable error state, said control step aborts waiting and informs of an abnormality of the ink-jet printing apparatus.

9. An information processing method in an information processing apparatus which is connected to an ink-jet printing apparatus that prints an image by ejecting ink onto a print medium on the basis of print data, and can exchange data with the ink-jet printing apparatus, comprising:

a print data generation step for generating print data for an image to be printed by the ink-jet printing apparatus;

a transfer step for transferring the generated print data to the ink-jet printing apparatus; and a control step for controlling transfer of the print data by said transfer step in accordance with transfer permission/denial information indicating transfer permission/denial of the print data, and operation information indicating an operation state of the ink-jet printing apparatus, which are sent from the ink-jet printing apparatus, wherein upon detection of transfer denial of the print data based on the transfer permission/denial information, said control step controls said transfer step to wait without transferring the print data, and measures a time for waiting, and wherein when said control step controls said transfer step to wait, said control step checks an operation state of the ink-jet printing apparatus on the basis of the operation information, and when the operation state indicates a predetermined oepration state, said control step controls to reset the time for waiting which is being measured.

10. An information processing method in an information processing apparatus which is connected to an ink-jet printing apparatus that prints an image by ejecting ink onto a print medium on the basis of print data, and can exchange data with the ink-jet printing apparatus, comprising:

a print data generation step for generating print data for an image to be printed by the ink-jet printing apparatus;

a transfer step for transferring the generated print data to the ink-jet printing apparatus; and a control step for controlling transfer of the print data by said transfer step in accordance with transfer permission/denial information indicating transfer permission/denial of the print data, and operation information indicating an operation state of the ink-jet printing apparatus, which are sent from the ink-jet printing apparatus, wherein upon detection of transfer denial of the print data based on the transfer permission/denial information, said control step controls said transfer step to wait without transferring the print data, and measures a time for waiting, and wherein when said control step controls said transfer step to wait and the time for waiting exceeds a predetermined period of time, said control step aborts waiting, and informs of an abnormality of the ink-jet printing apparatus.

* * * * *